United States Patent

Smith

[15] 3,688,662
[45] Sept. 5, 1972

[54] PHOTOFLASH MOUNTING ADAPTER FOR CLOSE-UP PHOTOGRAPHY

[72] Inventor: Gerald H. Smith, 1433 A Ohio Ave., Fort Campbell, Ky. 42223

[22] Filed: March 12, 1971

[21] Appl. No.: 123,698

[52] U.S. Cl. ................................... 95/11 R, 95/11 L
[51] Int. Cl. ........................................... G03b 19/02
[58] Field of Search....... 95/11 L, 11 R; 240/1.3, 2 C; 355/55

[56] References Cited

UNITED STATES PATENTS

| | | | |
|---|---|---|---|
| 2,596,376 | 5/1952 | De Goeij | 240/2 C X |
| 3,472,140 | 10/1969 | Moffitt | 240/1.3 X |
| 2,478,545 | 8/1949 | Pearce | 95/11 R |
| 2,682,603 | 6/1954 | Dine et al. | 240/1.3 |
| 2,760,048 | 8/1956 | Schulte | 240/1.3 |

FOREIGN PATENTS OR APPLICATIONS 952,399   11/1956   Germany.................240/1.3 X

*Primary Examiner*—Samuel S. Matthews
*Assistant Examiner*—Kenneth C. Hutchison
*Attorney*—Synnestvedt & Lechner

[57] ABSTRACT

An adapter ring for mounting a light source on a camera lens tube for close-up photography. The adapter includes means to vary the angle defined by the optical axis of the camera lens and the light beam emanating from the light source, to enable a light beam of appropriate intensity to be directed onto the subject to be photographed from a most favorable angle; alternatively, the adapter may be constructed such that the angle subtended by the light beam with respect to the optical axis of the lens is optimized for a particular camera-to-subject distance. Additional adjustment means are provided to enable the light source to be repositioned to any point on a circle of revolution defined about the optical axis of the camera lens.

5 Claims, 12 Drawing Figures

PATENTED SEP 5 1972 3,688,662

INVENTOR.
GERALD H. SMITH

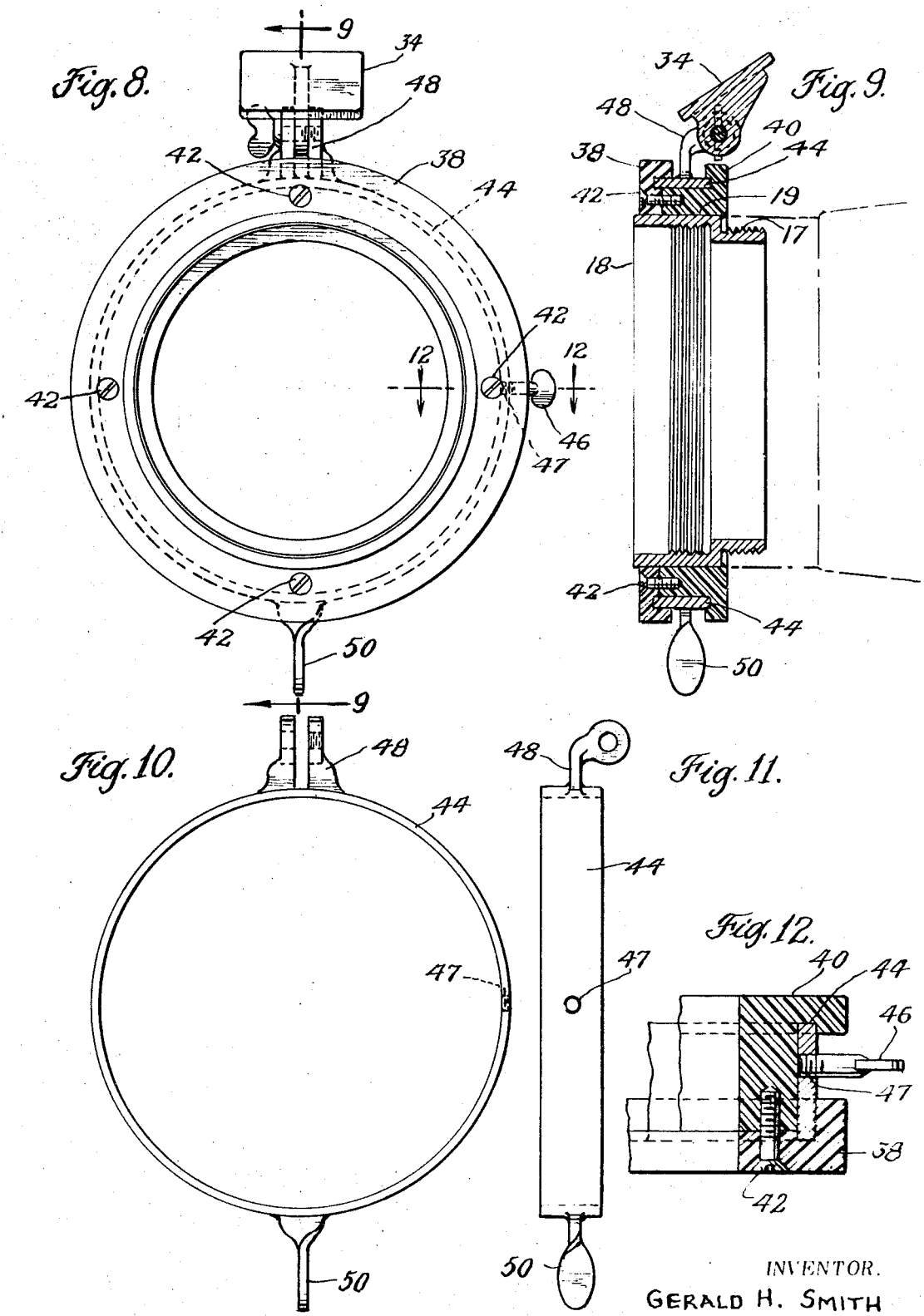

PHOTOFLASH MOUNTING ADAPTER FOR CLOSE-UP PHOTOGRAPHY

BACKGROUND OF THE INVENTION

Cameras used in conventional photography generally have means associated with the housing thereof for mounting artificial light sources comprising flashbulbs or electronic flash equipment. Photographic equipment used in close-up photography such as intra-oral photography, microphotography and macrophotography commonly embody elaborate focusing systems such that conventionally mounted artificial light sources are ineffectively located to properly illuminate the subject to be photographed. Conventional studio photographic lights produce beams that are too broad for close-up photography. They tend to "wash out" fine detail and shape.

Advantage has been made of certain conventional light sources the design of which permits mounting the light source in close proximity to the camera lens. One such unit is the electronic flash ring light shown in the patent to Dyne et al U.S. Pat No. 2,682,603. The ring light recommends itself for use in close-up photography because of an otherwise insufficient camera-to-subject distance in which to mount a conventional photoflash or electronic flash unit. By the very nature of its construction the ring light provides flat frontal lighting resulting in shadowless, two-dimensional lighting. This type of lighting is unable to produce the three-dimensional modeling effect needed in close-up photography to highlight the character and reveal the texture of the subject. The ring light has the added disadvantage of being prohibitively expensive. Less expensive substitutes such as the Shadowless Photographic Light of Schulte U.S. Pat. No. 2,760,048 suffer from the same deficiencies as have been noted above.

Good lighting in close-up photography necessitates a main light to highlight the subject in a manner that will provide sufficient shadow to create a sense of depth without obscuring the object to be photographed. The light must be freely positionable to permit proper illumination of the key details of the subject. Fill-in or accent illumination may be necessary to soften dense shadows and lighten localized areas for tone contrast.

It has been found that the most desirable lighting results are achieved when the distance from the light source to the subject being photographed is minimized and the angle subtended by the light beam and the optical axis of the camera lens (i.e., the lens-to-subject axis) is optimized. This permits the subject to be illuminated from a single light source thus obviating the need for fill-in or accent illumination.

It is the object of the present invention to provide apparatus for mounting a light source on a camera to be used in close-up photography such that a subject to be photographed is optimally illuminated.

The foregoing object is achieved by mounting the light source in close proximity to the camera lens and providing means to control the angle between the light beam and the optical axis of the camera lens. As used herein the phrase "close proximity to the camera lens" means near the outer extremity of the lens element and as near as possible to the optical axis so as to minimize the possibility of the lens element casting a shadow on the subject. The light source should be positioned so that it will not in any way obstruct the lens opening or cast light directly on the lens. Additional facility is afforded by mounting the light source such that it can be moved to any point around the entire periphery of the lens, thus permitting the light source to be positioned to one side or another of the camera lens or above or below the lens. The operating characteristics of the subject apparatus are further enhanced by permitting the light source to be variously positioned such that the light beam emanating therefrom is directly oriented at the subject to be photographed.

Accordingly, it is a more specific object of the present invention to provide apparatus for mounting a light source to be used in close-up photography which enables the light source to be positioned in close proximity to a camera lens and variably positioned with respect to said lens so as to optimize the illumination of the subject to be photographed.

In the preferred embodiment, the present invention comprises an adapter ring designed to hold a self-contained electronic flash unit in close proximity to the camera lens with means to permit the light source to be vertically angled through a range of 90° with respect to the lens-to-subject axis.

The preferred adapter includes a threaded portion which enables it to be screwed onto the lens housing of photographic equipment in place of a conventional light filter. This type of mounting permits the flash unit to be moved simultaneously with the lens barrel as it is extended or retracted to focus the camera or to change magnification ratios.

It has been found that for a lens of any given focal length a definite correlation exists between the magnification ratio and the angularity of the light source. This assumes the use of a normal focal length macro lens (45 mm. to 60 mm. range). An analysis of photographs of the same subject taken with a 55 mm. focal length macro lens at magnifications of 1:1 to 1:10 and with an angularization of the light beam varied from 0° to 60° with the light source mounted on the adapter of this invention at the 12 o'clock position with respect to the lens element, and also with the light source mounted at the standard or conventional mounting bracket of the camera, supports the conclusions that maximum quality is achieved with use of a specific flash angle at a particular magnification ratio. The results of the study are reproduced in tabular form below:

| | Standard Position | | 0 Degree | | 15 Degrees | |
|---|---|---|---|---|---|---|
| 1:1 | unacceptable | 1:1 | unacceptable | 1:1 | unacceptable |
| 1:2.5 | fair | 1:2.5 | good | 1:2.5 | good |
| 1:5 | excellent | 1:5 | excellent | 1:5 | excellent |
| 1:7.5 | excellent | 1:7.5 | excellent | 1:7.5 | excellent |
| 1:10 | excellent | 1:10 | excellent | 1:10 | excellent |

| 30 Degrees | | | 45 Degrees | | 60 Degrees | |
|---|---|---|---|---|---|---|
| 1:1 | fair | 1:1 | excellent | 1:1 | unacceptable |
| 1:2.5 | excellent | 1:2.5 | fair | 1:2.5 | unacceptable |
| 1:5 | excellent | 1:5 | unacceptable | 1:5 | unacceptable |
| 1:7.5 | fair | 1:7.5 | unacceptable | 1:7.5 | unacceptable |
| 1:10 | fair | 1:10 | unacceptable | 1:10 | unacceptable |

In summary for a 55 mm. focal length macro lens with the light source mounted in close proximity to the lens, it would appear that maximum definition and contrast quality is achieved at the various magnification ratios using the following flash angles:

1:1      45 degree angle
1:2.5      30 degree angle

| | |
|---|---|
| 1:5 | standard position & 0 deg. to 30 deg. |
| 1:7.5 | standard position & 0 deg. to 15 deg. |
| 1:10 | standard position & 0 deg. to 15 deg. |

From the results reported above it is clear that for the working distances involved at magnifications of the order of 1:1 to 1:3 using a 55 mm. focal length macro lens, adequate lighting is achieved only when the light source is in close proximity to the camera lens and angled substantially toward the lens-to-subject axis. However, 1:5 ratios or more, standard or conventionally mounted light sources give entirely acceptable lighting.

Because of the definite correlation that exists between the magnification ratio (or the lens-to-subject working distance) and the light beam or flash angle, means may be provided to mechanically couple the focusing mechanism of the camera with the means for angulating the light source such that for every magnification ratio the light source will assume the proper orientation with respect to the subject being photographed so as to optimize the illumination thereof.

As an alternative to the more sophisticated implementations mentioned above, the principles of the present invention may be inexpensively embodied in a set of adapter rings designed for use at a pre-determined magnification ratio. In such implementation, the mounting means for the light source for any given adapter ring is fixed at a predetermined axis with respect to the optical axis of the camera lens.

For a better understanding of the invention, its advantages and specific objects allowed with its use, reference should be made to the accompanying drawings and descriptive matter in which there is illustrated and described a preferred embodiment of the invention.

In the drawings:

FIG. 8 is a front view of a further modification of the adapter comprising the present invention;

FIG. 9 is a section on the line 9—9 of FIG. 8;

FIG. 10 is a detailed view of the adjustable ring portion of the adapter of FIG. 8;

FIG. 11 is a side view of FIG. 10; and

FIG. 12 is an enlarged cross section of line 12-12 of FIG. 8.

Figure 1:
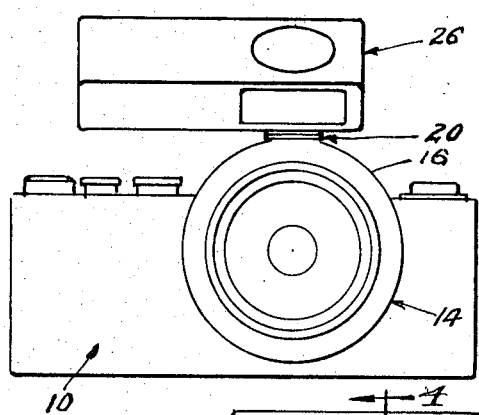
FIG. 1 is a front view of a camera including a teaching of the present invention.
Figure 2:
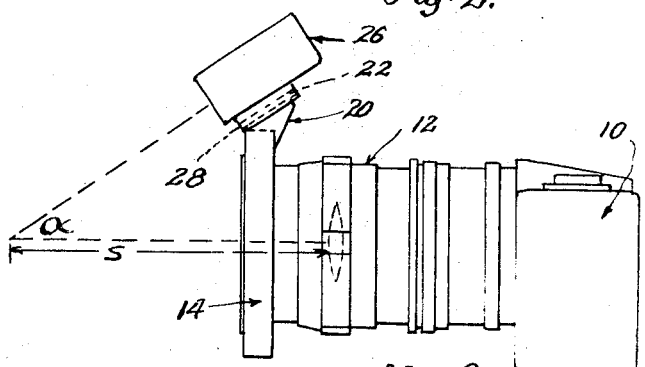
FIG. 2 is an end view of the camera of FIG. 1, as viewed from the right.

Referring now to the drawings, particularly FIGS. 1 and 2, therein is disclosed a camera 10 including a lens housing 12 upon which is mounted an adapter 14 constituting the subject of the present invention. In the preferred embodiment of the present invention the adapter 14 is constructed of both metal and acrylic materials; however, any suitable material may be used.

In the embodiment of FIGS. 1 to 5 the adapter 14 comprises an outer acrylic ring member 16 surrounding an inner metallic ring 18 that is externally threaded 17, permitting it to cooperate with the threaded end portion of the lens housing 12 normally used to accommodate a light filter or other camera accessory. The inner ring 18 is preferably stepped and the step 19 on which ring 16 is carried is dimensioned to permit the front portion of the lens housing 12 to fully retract without interference thus permitting the adapter to be used over the full range of magnifications.

The outer ring 16 surrounding the inner threaded ring members 18 has at one point thereon an appendage 20 comprising a metal shoe 22 which serve as a mounting element adapted to engage a mating mounting element (comprising the guide member 28 and the associated spring plate 24) that is secured to a self-contained electronic flash unit 26. In the embodiment of FIGS. 1 to 4 shoe 22 is firmly fixed to the outer ring member 16 so as to assume a predetermined angle with respect to the optical axis of the camera lens. In such cases rings having shoes set at different included angles ($\alpha$) must be used depending on the lens-to-subject working distance (s). As previously noted, the angle at which the shoe is fixed may be varied over a range of from 0° to 90°; however, when working with a 55 mm. macro lens in a range of magnifications of from 1:1 to 1:3 optimum results are achieved when the included angle ($\alpha$) falls in the range from about 30° to about 60°.

Figure 3:
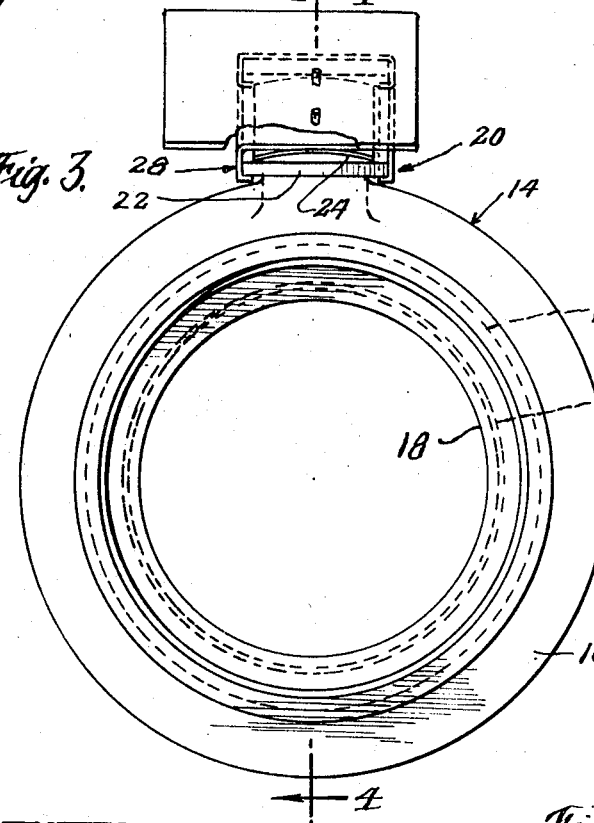
FIG. 3 is an enlarged front view depicting in detail the adapter of FIGS. 1 and 2 comprising the present invention including the guide portion thereof that is secured to the light source.
Figure 4:
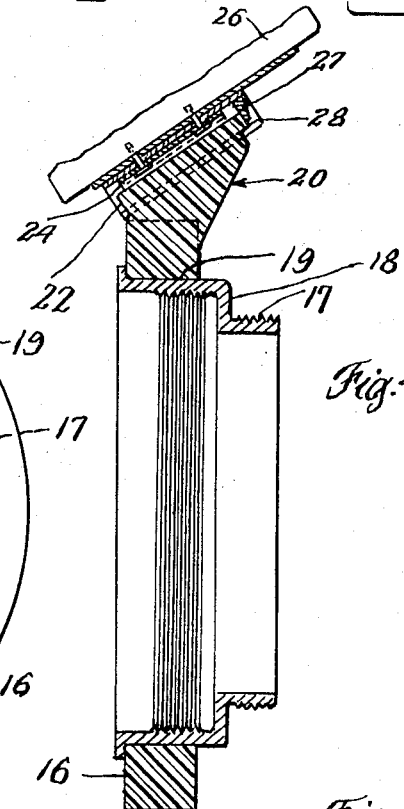
FIG. 4 is a section on the line 4—4 of FIG. 3.

FIGS. 3 and 4 show an enlarged front view of the adapter unit of FIGS. 1 and 2 including details of the mating mounting element carried by the flash unit 26. As shown in FIG. 4 said element includes a guide member 28 which cooperates with the metal shoe portion of the adapter 14 and the spring plate 24 that ensures a firm mount when the shoe and guides are assembled and stop 27 that fixes the position of the flash unit relative to shoe 22.

Figure 5:
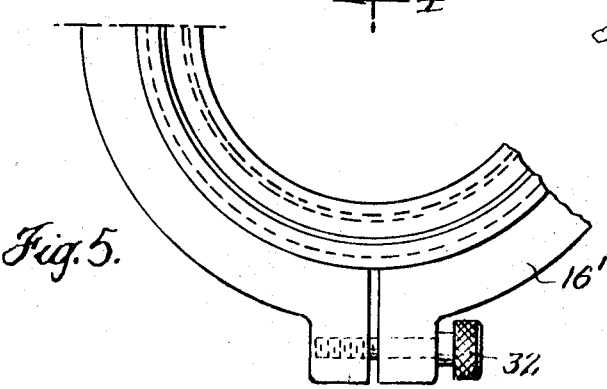
FIG. 5 is a modification of the adapter of FIG. 3.

FIG. 5 shows a modification of the adapter of FIGS. 1 – 4 which includes a split outer ring 16¹ and a clamping screw 32 arrangement to permit rotational adjustment of the adapter to the most desirable flash position about the lens axis.

Figure 6:
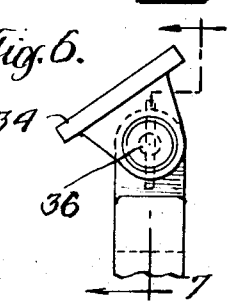
FIG. 6 is a further modification of the adapter of FIGS. 3 and 4, including an adjustable bracket.
Figure 7:
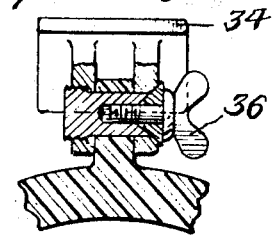
FIG. 7 is a section on the line 7—7 of FIG. 6.

FIGS. 6 and 7 disclose a further modification of the adapter of FIGS. 1 through 4 which enables the degree of angularization of the mounting element thereof to be varied with respect to the optical axis of the camera lens. In this respect there is shown a platform 34 corresponding to the shoe 22 of FIG. 2 that is mounted on a pivot assembly that permits the platform 34 to be oriented at any desired angle ($\alpha$) of from 0° to 90° with respect to the optical axis of the camera lens. Clamping screw 36 enables the pivoted platform 34 to be fixedly held at the desired angle.

FIGS. 8 and 9 show further modification of the adapter constituting the subject of the present invention. In the modified adapter of FIGS. 8 and 9 the equivalent to the outer ring member 16 of FIGS. 1 through 4 is comprised of front and rear rim members 38 and 40, respectively. In the illustrated embodiment of the present invention the front and rear rim members 38 and 40 are held together by four screws 42, however, it is contemplated that the function of members 38 and 40 may be served by a single member properly configured. The front and rear rim members 38 and 40 are so configured that the joinder thereof results in the formation of a groove within which a metal ring 44 is cooperatively positioned. By way of a vertical supporting strut 48 affixed to ring 44 there is secured a tiltable platform 34 in the nature of that disclosed in FIGS. 6 and 7. Disposed opposite the vertical strut 44 and mounting platform 34 is a finger actuated lever 50 for rotating the platform 34 about the optical axis. Lever 50 is fixedly attached to the ring 44 such that when the tightening screw 46 set in tap hole 47 is loosened the ring assembly is free to rotate within the front and rear rims 38 and 40 thereby allowing the mounting platform and light source associated therewith to be repositioned to any point about the periphery of the lens. If desired a single element can be adapted to function as the set screw 46 and finger activated lever 50.

FIGS. 10 and 11 show a detailed construction of a ring 44 including the vertical mounting strut 48 and the lever 50.

FIG. 12 is an enlarged cross section on line 12—12 of FIG. 8 showing details of the tightening screw 46.

The advantages attendant with the use of any or all of the various embodiments of the present invention should be readily apparent from the foregoing. Included among these is the economic savings resulting from the use of the adapter, both with respect to the nominal cost of the unit and the ability to use in conjunction therewith, inexpensive, self-contained, miniature flash equipment. Such equipment is generally available with rechargeable batteries, thus precluding the need for a separate power source.

Adapters embodying the principles of the present invention have been successfully tested in situations involving the preparation of colored and black and white pictures and slides. These adapters have proven particularly valuable in intra-oral and general close-up work for recording many phases of dental restoration. Other equally effective uses should be readily apparent to those skilled in the art.

What is claimed is:

1. An adapter ring for mounting a single beam light source for use in close up photography where the lens to subject working distance is very short, in combination with a camera having a macro lens, said adapter ring having two stepped and coaxially aligned ring sections of differing diameters, the external annular surface of the first smaller diameter ring section being threaded for engagement with threads on the inner wall of a camera lens tube, the second larger ring section carrying a first accessory mounting element adapted to engage a second accessory mounting element secured to the light source, said first accessory mounting element being adapted to position the light source near the outer extremity of the lens tube as near as possible to the optical axis of the lens system but without obstructing the lens opening or casting light on the lens, the first accessory mounting element also being adapted to angularly position the light source so that a beam of light therefrom illuminates the subject being photographed and intersects the optical axis of the lens system at an included angle of 30° to 60°.

2. An adapter according to claim 1 wherein the first accessory mounting element is carried by a third ring section surrounding and rotatable on the second ring section, said third ring section being provided with means to enable the light source to be positioned and maintained at any point on the periphery of the second ring about the optical axis of the lens.

3. An adapter according to claim 1 wherein the first accessory mounting element includes means permitting varying the angularity of the light beams from 30° to 60° and for maintaining a desired degree of angularity.

4. An adapter according to claim 3 wherein the first accessory mounting element is carried by a third ring surrounding and rotatable on the second ring member, said third ring being provided with means to enable the light source to be positioned and maintained at any point on the periphery of the second ring about the optical axis of the lens.

5. An adapter ring according to claim 1 wherein the second ring section diameter is dimensioned to permit the lens tube to fully retract without interference into the sleeve of the lens element over the full range of magnification.

* * * * *